Nov. 17, 1931.  F. W. DE JAHN  1,832,102
PROCESS FOR CONVERTING ATMOSPHERIC NITROGEN INTO
A COMPOUND CONTAINING COMBINED NITROGEN
Original Filed Nov. 3, 1917    10 Sheets-Sheet 8
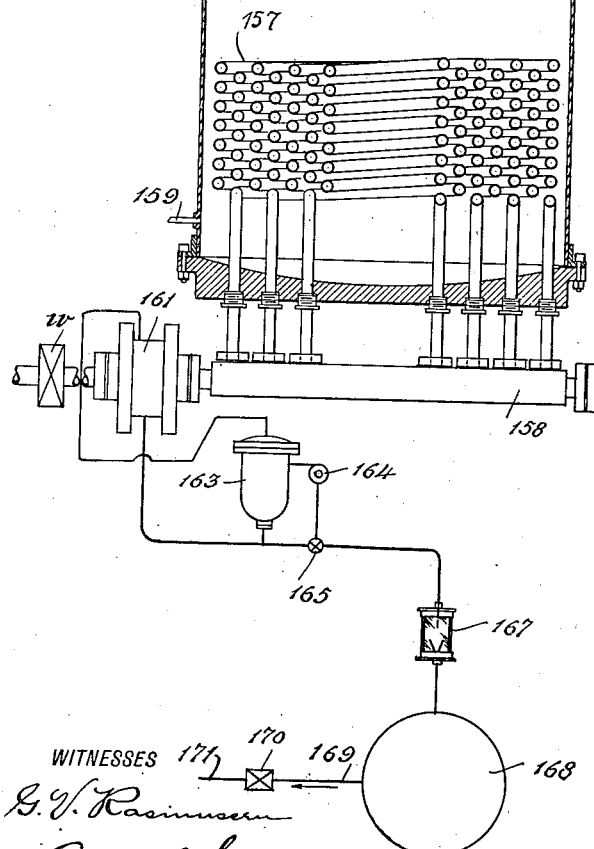
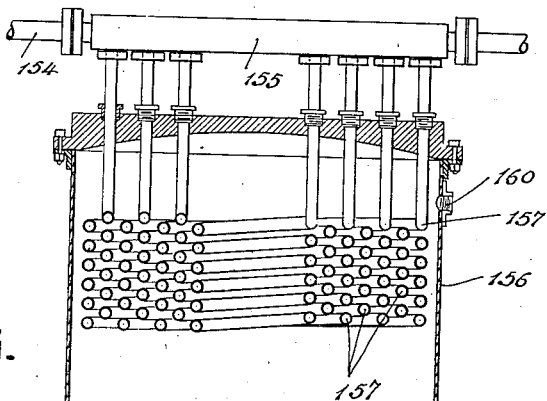
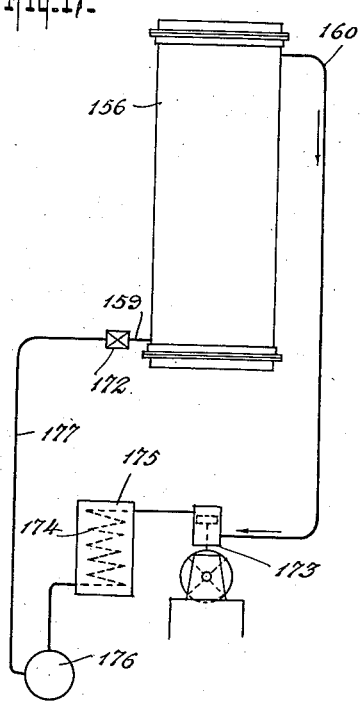
WITNESSES
INVENTOR
FREDRIK W. de JAHN
BY
ATTORNEYS

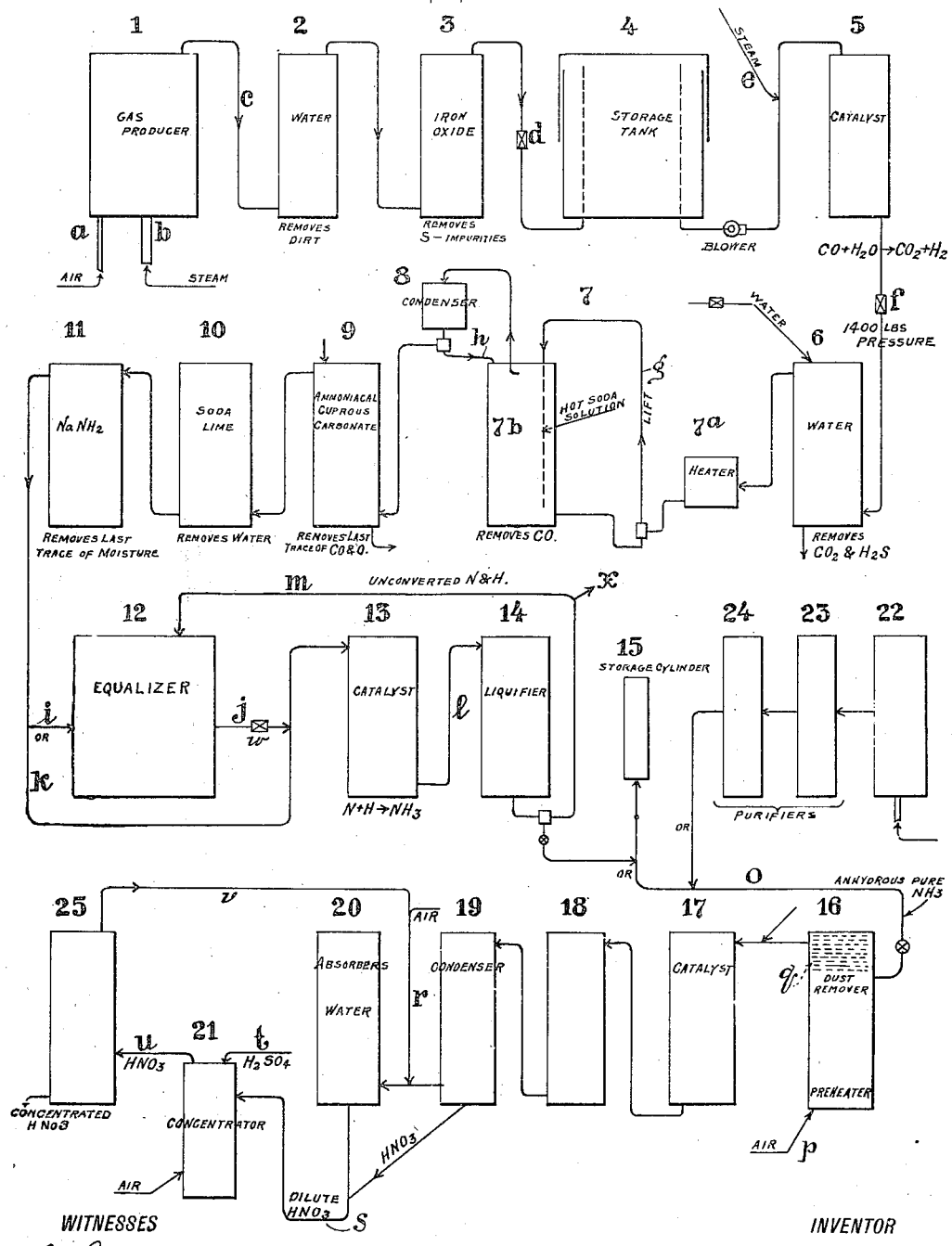

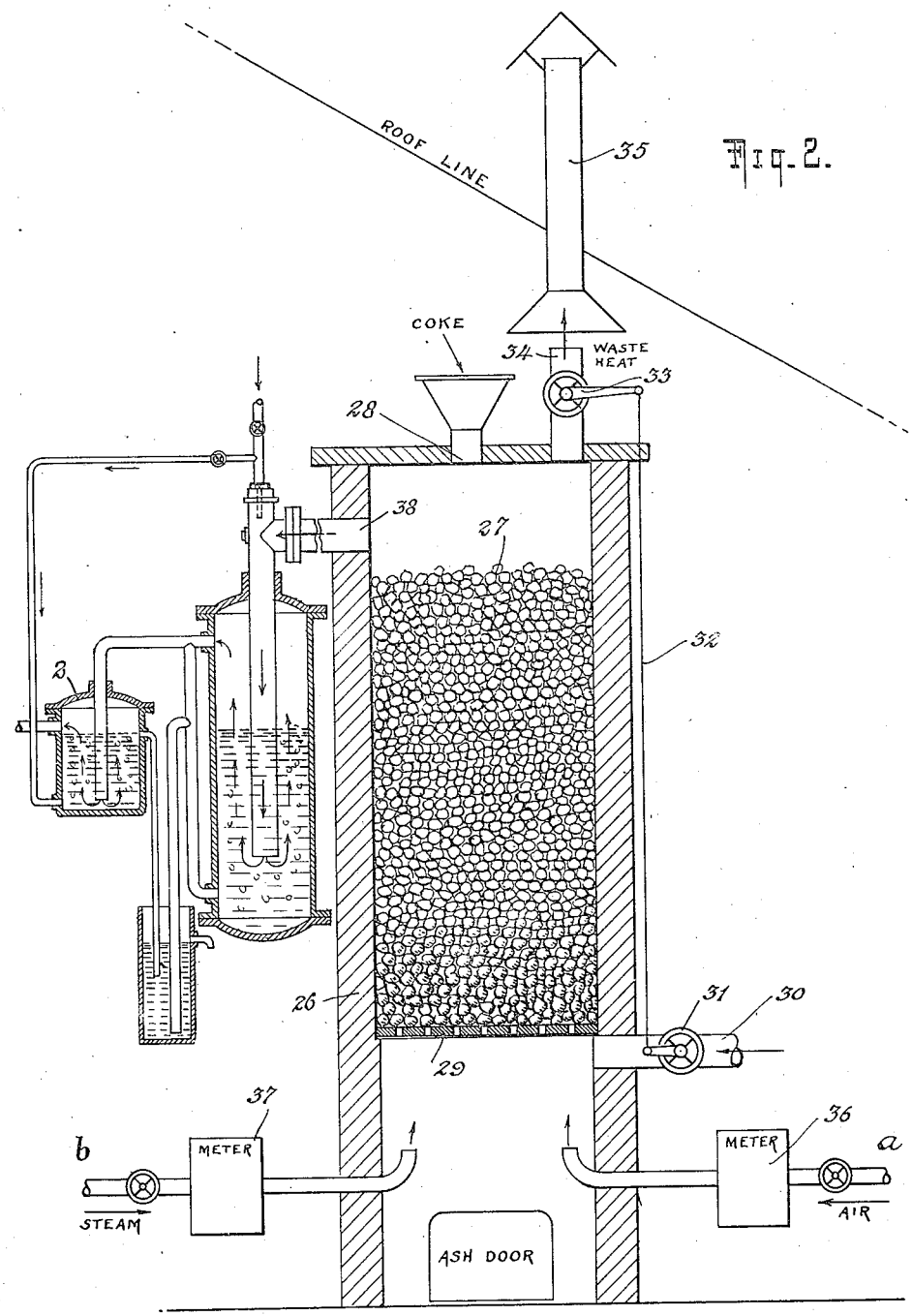

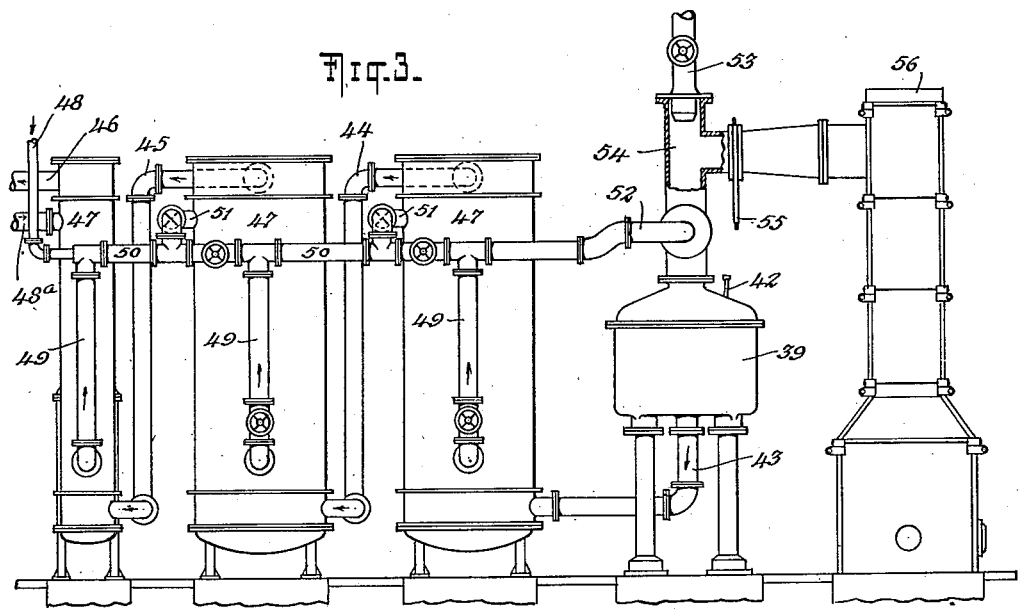
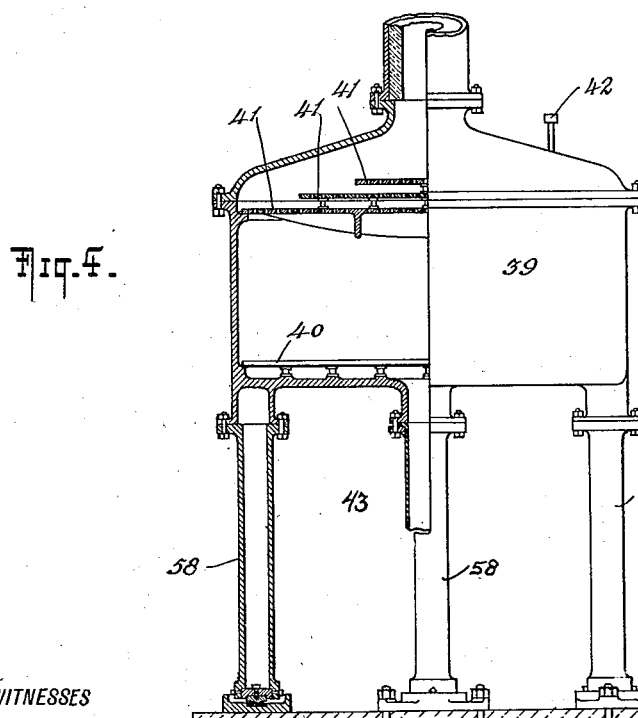
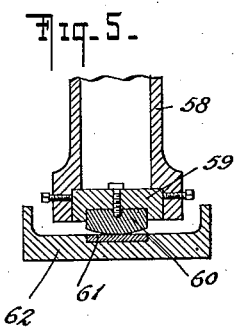

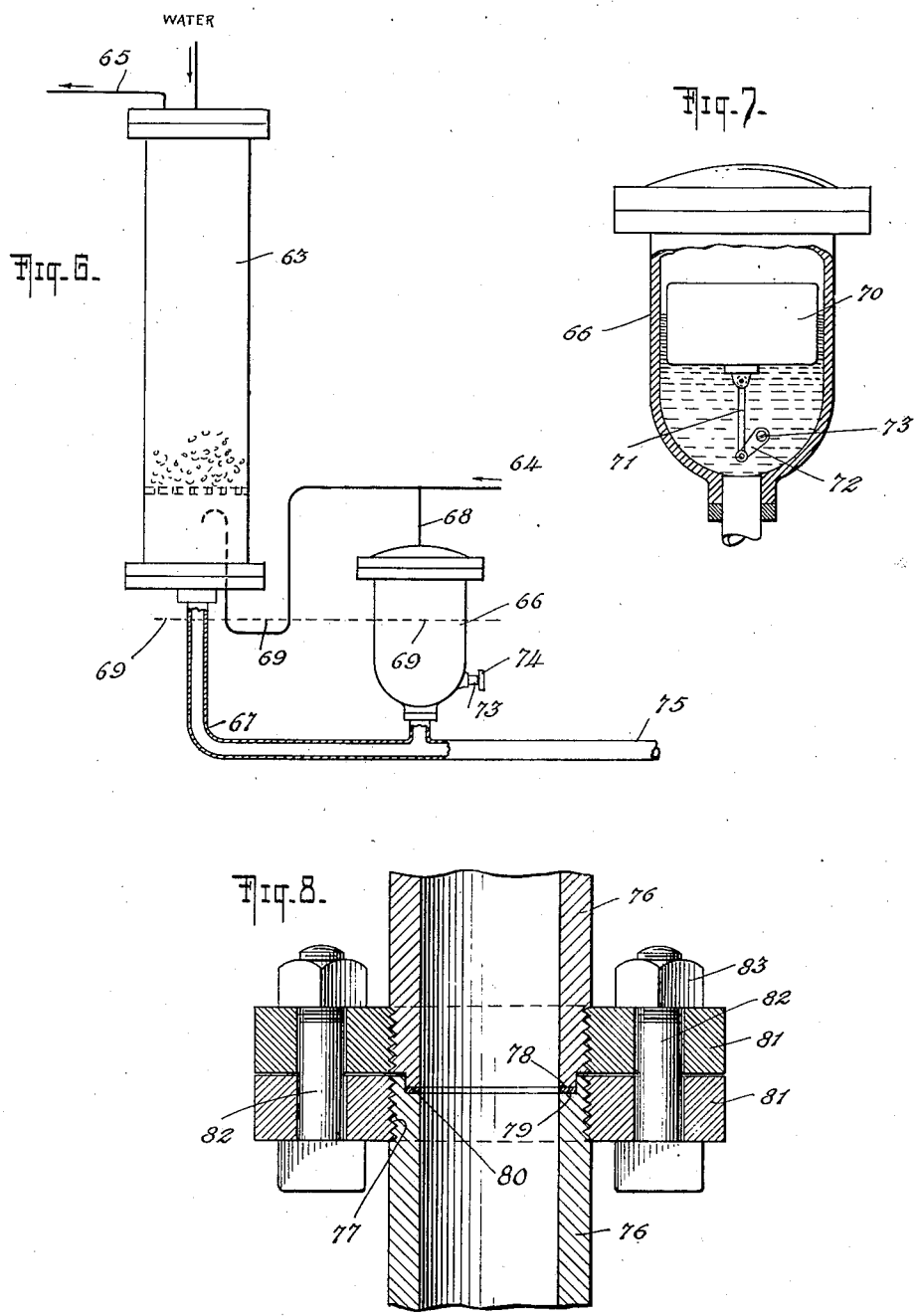

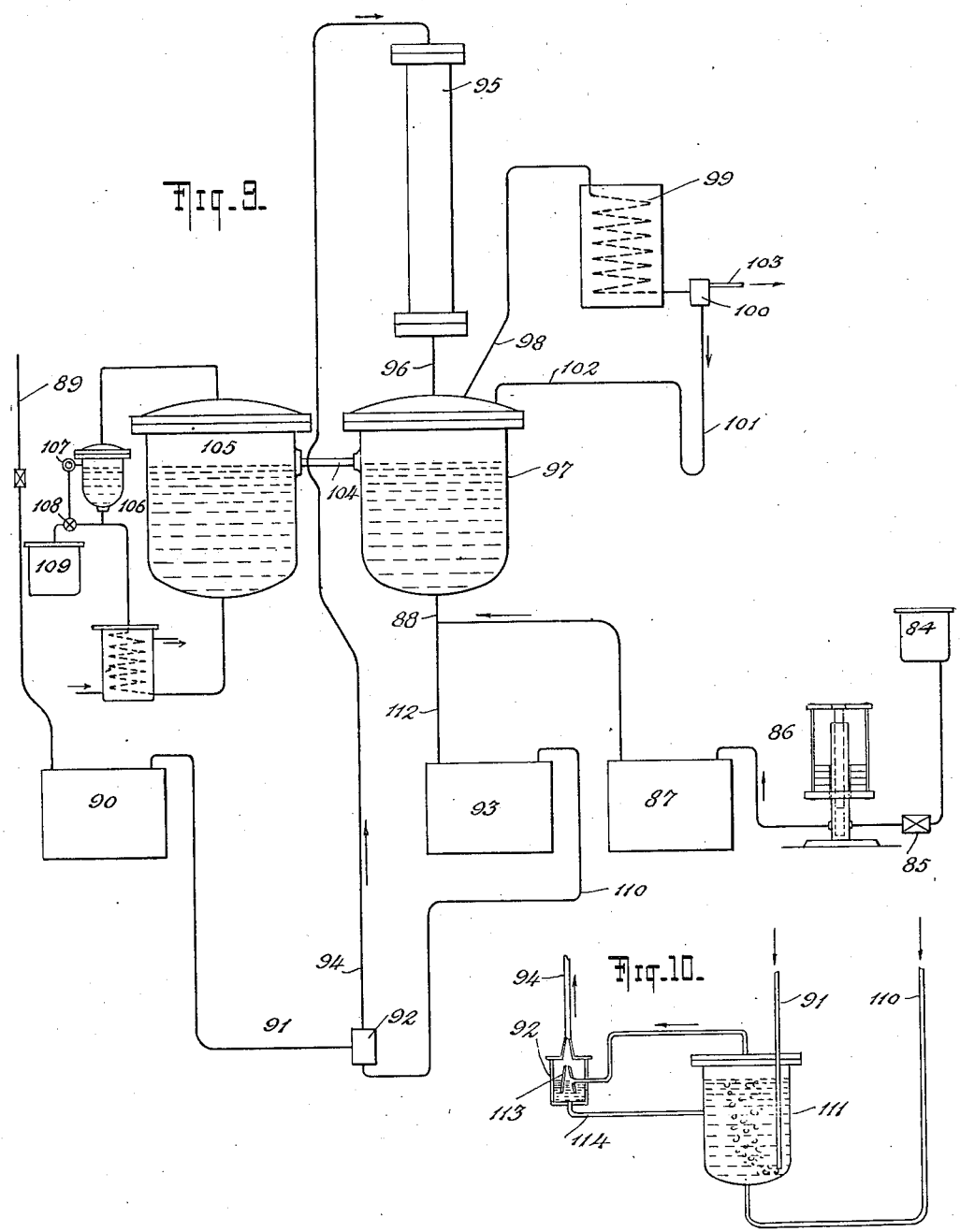

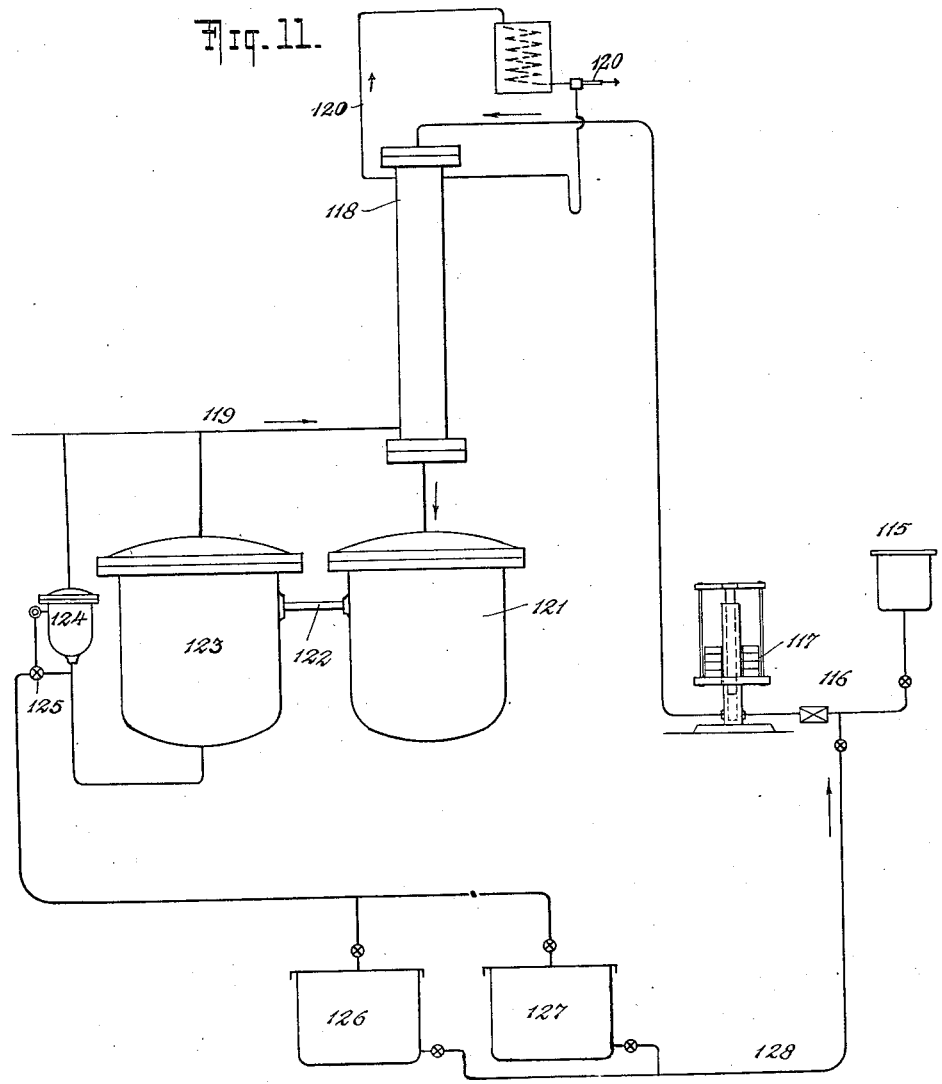

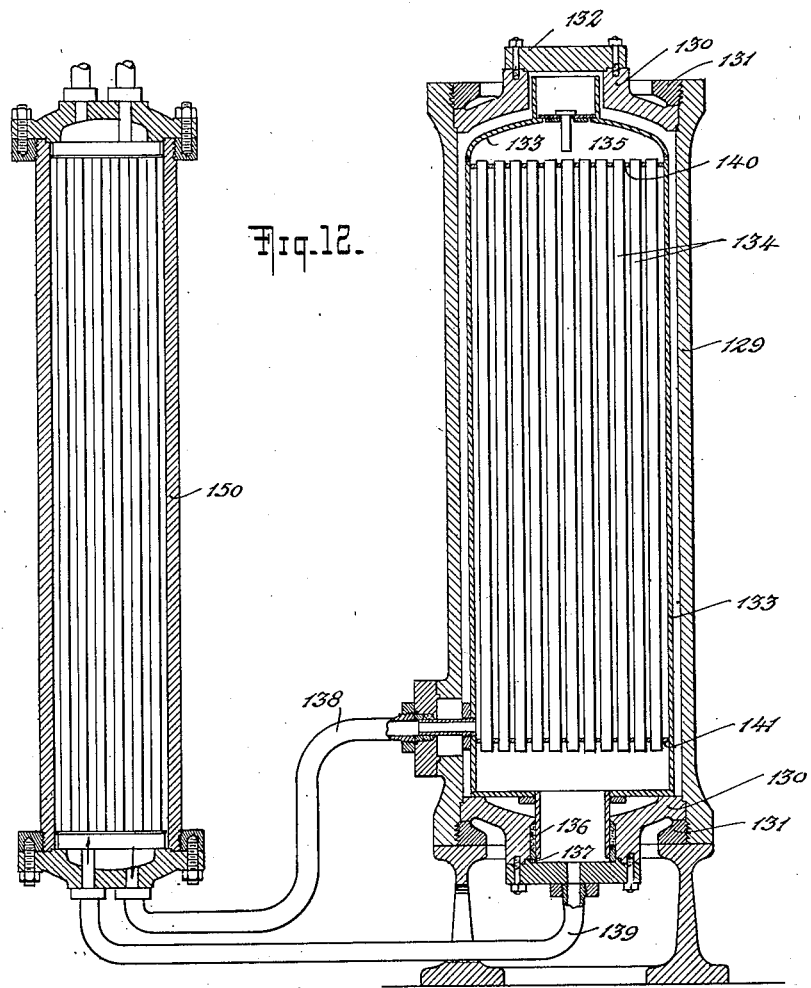
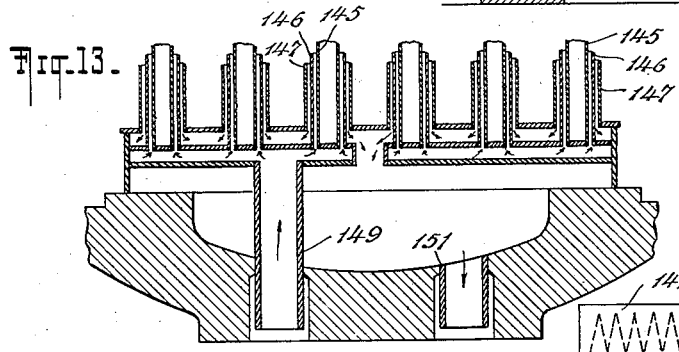
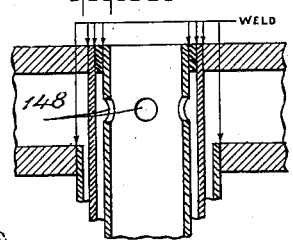
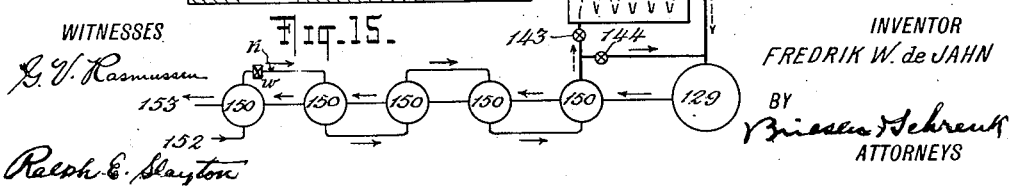

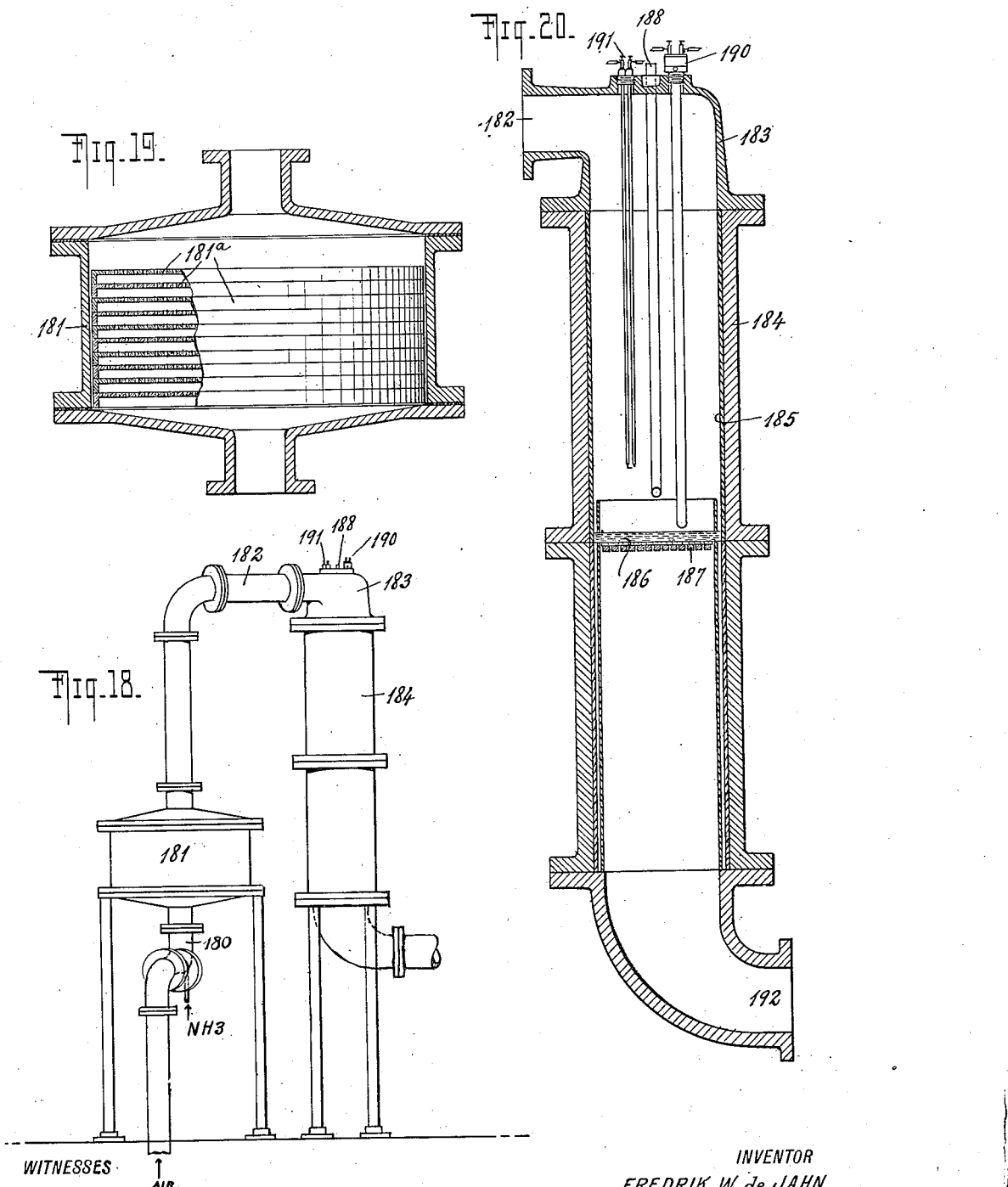

Nov. 17, 1931. F. W. DE JAHN 1,832,102
PROCESS FOR CONVERTING ATMOSPHERIC NITROGEN INTO
A COMPOUND CONTAINING COMBINED NITROGEN
Original Filed Nov. 3, 1917 10 Sheets-Sheet 10
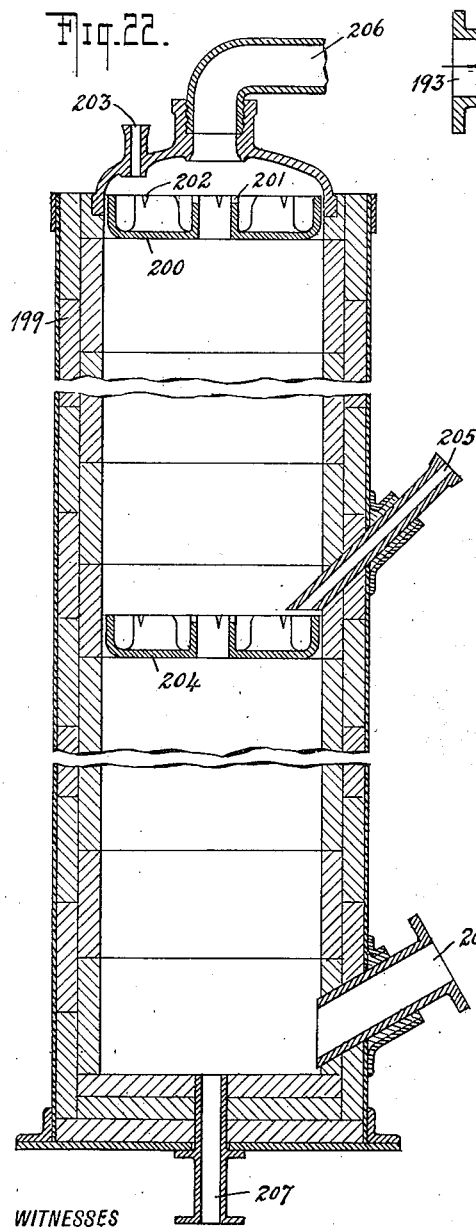
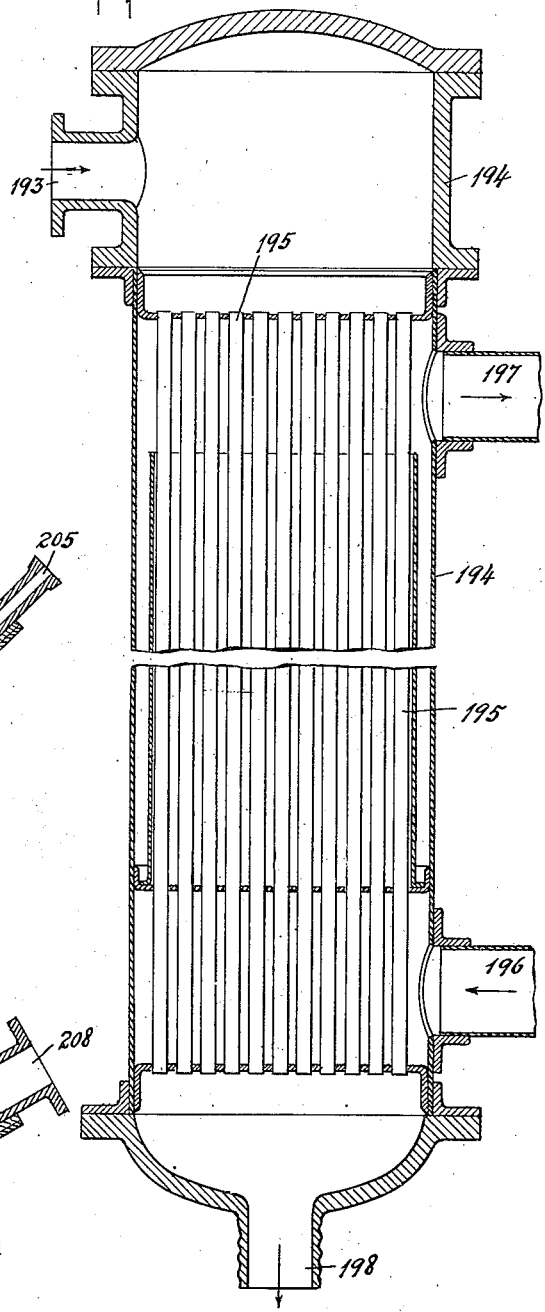
WITNESSES
G. V. Rasmussen
Ralph E. Slayton
INVENTOR
FREDRIK W. de JAHN
BY
Biesen & Schrenk
ATTORNEYS Patented Nov. 17, 1931

1,832,102

UNITED STATES PATENT OFFICE

FREDRIK WADE DE JAHN, OF NEW YORK, N. Y., ASSIGNOR, BY MESNE ASSIGNMENTS, TO ATMOSPHERIC NITROGEN CORPORATION, OF NEW YORK, N. Y., A CORPORATION OF NEW YORK

PROCESS FOR CONVERTING ATMOSPHERIC NITROGEN INTO A COMPOUND CONTAINING COMBINED NITROGEN

Application filed November 3, 1917, Serial No. 471,158. Renewed May 20, 1921.

This invention relates to the utilization of the nitrogen of atmospheric air and to its conversion into permanent compounds containing nitrogen and more particularly nitric acid of high strength. The object of the invention is the production of the said result on lines which are economical, efficient and commercial.

It has been known for many years that the only available compound containing sufficient fixed nitrogen to be used on a world-wide scale as a nitrogenous manure is Chile saltpetre, the deposits of which are being rapidly exhausted. For years, therefore, intensive chemical experiments have sought to solve the nitrogen problem and to devise means to effect a fixation of atmospheric nitrogen upon a scale and at a cost which will enable the product to replace the products from the nitrate of soda deposits.

The present invention is designed to supply relief for this problem and produce on a commercial scale and under economical and efficient conditions an adequate supply of nitrogen compounds.

According to the present invention, the raw materials selected are among the most abundant and least expensive of available supplies. For the required quantities of nitrogen, atmospheric air is the raw material and air is also the source of a part of the oxygen employed in the process. The balance of the oxygen which is employed, as well as of the hydrogen which is used in this process, is derived from steam, while coke (or the combustion products from coke) supplies the heat and the carbon needed at the outset of the process. A brief outline of the process and omitting for the moment many important details which will be described later, is as follows:—

In carrying out the invention heated coke is treated with air and steam to produce gas containing nitrogen, hydrogen and carbon monoxid, the latter two being preferably in excess of the former. By maintaining the proper degree of heat a continuous production of said gases may be brought about but the following discontinuous process, by reason of its simplicity, serves excellently as an illustrative example of this phase of the operation. Coke is first heated by an air blast and thereupon a mixture of air and steam is injected through the incandescent mass, the proportions thereof being so regulated that the resultant gas has the approximate composition of one volume of nitrogen ($N_2$) and three volumes of gas composed of hydrogen ($H_2$) and of carbon monoxid ($CO$). When at the end of a few minutes the coke cools to such an extent that incomplete decomposition of the entering steam results, the current of steam and air is discontinued and air alone injected until the coke has again reached the requisite temperature, whereupon the air-steam current is again injected. The product of this treatment, that is, the resultant gas which is led into the gas holders, may be considered as composed of nitrogen, hydrogen and carbon monoxid in the proportion of one volume of nitrogen to three volumes of the combined hydrogen and carbon monoxid. At a subsequent stage this mixture of gases is mixed with steam in regulated quantities and passed over a catalyst, the result being the decomposition of steam and the conversion of $CO$ into $CO_2$ with the liberation of hydrogen. This means that for each volume of carbon monoxid that is oxidized into one volume of carbon dioxide, there will be simultaneously produced one volume of hydrogen so that the resultant gas contains nitrogen and hydrogen in the volume proportions of one to three. The gas is then subjected to pressure and while being circulated under the pressure its carbon dioxide is eliminated and the gases then further purified until substantially only nitrogen and hydrogen in the proportions of one to three remain. The nitrogen-hydrogen mixture, still under the pressure of the system is then subjected to catalytic action and converted into the form of ammonia, which is then passed on and used for oxidation to nitrogen oxides. This is accomplished by mixing the purified ammonia gas and heated air in the proper proportions for combustion and passing these mixed gases through a suitable catalyzer until oxidation takes place. The gases thus produced and consisting of nitrogen oxides and water vapor, mainly, are then cooled and subsequently in part condensed. The residual gases mixed with air are passed slowly through absorbers containing water wherein further oxidation and absorption of the nitrogen compounds takes place resulting in the formation of dilute nitric acid. The nitric acid, both the condensed and absorbed products are then heated (for which purpose hot sulfuric acid hereinafter referred to may be used) and while hot, a current of air (preferably heated) is passed through them, the air carrying the distillation products along with it upwardly through a tower in which, at the upper part thereof, they come in contact with a countercurrent of concentrated hot sulfuric acid which takes up water vapor, leaving nitric acid vapors mixed with air. By cooling these vapors in a condenser, a condensate of approximately 97% nitric acid is obtained.

In achieving the object of this invention a number of auxiliary inventions were made, all of them growing out of a conception of the process as a whole and developed for the purpose of having them constitute cohering elements in said process and without regard to their present-day or prospective utility in any other art or manufacture or for any other industrial purpose than specifically the one for which it was conceived.

To describe the process more at length, reference will be had to the accompanying drawings in which Fig. 1 illustrates diagrammatically the course of the process as a whole; Fig. 2 represents a vertical sectional view of the gas producer which constitutes element number 1 of Fig. 1; Fig. 3 represents an elevation of that portion of the apparatus intermediate the storage tank 4 and the high pressure pump $f$ of Fig. 1, said view representing generally the apparatus and its connections within which the catalytic reaction generally represented as

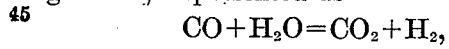

$$CO + H_2O = CO_2 + H_2,$$

is carried out; Fig. 4 is a partly sectional view of the catalytic chamber shown in Fig. 3; and Fig. 5 is a sectional detail view of one of the supports for said catalytic chamzer; Fig. 6 illustrates the connection between scrubbing tower and automatic float valve employed at that part of the system numbered 6 in Fig. 1; Fig. 7 is a sectional detail view of the float valve of Fig. 6; Fig. 8 is a sectional view of the point which is employed in connecting the various parts of the apparatus for the purpose of assuring a proper connection in view of the high pressure in the system; Fig. 9 is a more detailed view of the caustic soda apparatus generally represented in the system numbered 7, 7ª, 7ᵇ and 8 of Fig. 1; and Fig. 10 is a detailed view of the gas saturator and injector employed in the system illustrated in Fig. 9; Fig. 11 illustrates the apparatus in which the treatment with ammoniacal cuprous carbonate is carried out, being a detail of that part of the process illustrated at 9 in Fig. 1; Fig. 12 is a sectional elevation of the apparatus comprising the catalytic chamber containing the ammonia catalyst and the heat exchange apparatus connected therewith and generally represented as 13 in Fig. 1; Fig. 13 is a sectional detail view of the lower part of one of the heat exchange columns and Fig. 14 is a similar view of the upper part thereof; Fig. 15 is a diagrammatic view showing the connections between the heat exchangers and the ammonia catalyst; Fig. 16 is a vertical section of the ammonia liquefier represented generally as 14 in Fig. 1; Fig. 17 is a diagrammatic view illustrating the circulation of the ammonia employed for cooling the liquefying apparatus illustrated in Fig. 16; Fig. 18 is a view of the catalytic section of the system in which oxidation of the gases takes place (numbered 17 in Fig. 1); Fig. 19 is a sectional view of the interior of the antechamber shown in Fig. 18, and Fig. 20 is a sectional view of the vestibule and catalytic chamber of Fig. 18; Fig. 21 is a sectional view of the air cooler (numbered 18 in Fig. 1) and Fig. 22 is a sectional view of the concentrator (numbered 25 in Fig. 1).

In the drawings (referring first to Fig. 1) the numeral 1 indicates an apparatus containing coke. For the purposes under consideration a generator gas apparatus of the usual type may be used. Into this apparatus lead the conduits $a$ and $b$, of which the former may be employed to serve the purpose of admitting the air blast by means of which the coke is brought to the requisite heat at which time its upper layer will be at a bright red heat. When this condition has been created, a mixture of air and steam, the latter through the conduit $b$ is introduced and is injected through the incandescent mass. The gases introduced into this apparatus 1 are regulated so that the resultant gas has the approximate composition of three volumes of hydrogen plus carbon monoxid to one volume of nitrogen. The relative proportions of air and steam entering the producer apparatus may be satisfactorily regulated by means of meters and in practice it is convenient to have the gas rates regulated by indications which show that the meters stand at the points which previous practice has proved to correspond to the required mixture and which points are marked in such a way as to be readily visible to the attendant. These meters may also be equipped with recorders showing the exact flow at any time of air and steam and these recorders will then serve the purposes just described. When, after the current of air and steam has been injected through the heated coke a relatively short time (approximately five minutes for example) the coke cools to such an extent as to result, unless reheated, in incomplete decomposition of the entering steam, the air-steam current is then discontinued, the gas exit closed, the producer 1 opened and an air blast alone introduced. The action of this air current is to restore to the coke the requisite temperature and when that is reached, the air blast is discontinued, the producer closed and the air-steam current again admitted. This action is repeated until the apparatus is required to be recharged with coke although it is apparent that, as in the case where the process is continuous, the coke supply may be replenished and the ashes removed so as to maintain a substantially constant coke-level within the apparatus without regard to the time when the respective currents are turned on or off.

The gas produced, as outlined above, leaves the gas producer, the connection being indicated at $c$, and is then washed with water in the apparatus 2. The object of this treatment is to remove dust and dirt and such other impurities as are capable of ready removal by means of water. Following the water treatment the gas is conveyed over or through iron oxide in the apparatus indicated as 3 whereby most of the sulfur impurity which may be considered as present in the gas in the form of $H_2S$ is removed. Following this last named purification step the gas may be passed through additional driers or purifiers such, for example, as a tower packed with lime, or it may be directly, as indicated by $d$, passed into gas holders, i. e. storage tanks, 4. These may be of any required number and normally contain an adequate volume of gases so that the balance of the process may be continuous and uninterrupted in spite of the fact that the gas itself may be produced in a discontinuous manner as suggested. The gas contained in the storage tanks 4 is a mixture of a variety of constituents a considerable number of which, for the purposes of the subsequent process, are to be considered as impurities. The major portion, however, of the gas mixture consists of nitrogen, hydrogen and carbon monoxid in a general or approximate proportion of one volume of nitrogen to three volumes of the two other named gases taken together.

From the gas holders the gas mixture is introduced to a catalyst in the apparatus indicated as 5, steam being added through the conduit $e$ before the gas mixture enters said apparatus. The proportions of steam thus added are regulated, which may be conveniently done by means of meters and indications therefor, as previously described in connection with the producer gas apparatus 1. The regulation of the quantity of the steam introduced at this point is such that, after allowing for a proper excess of steam to prevent the choking up of the apparatus with separated carbon, there is present sufficient steam in the proper proportions so that the resultant gas will contain nitrogen in the proportion of one volume to each three volumes of hydrogen, the remaining carbon monoxid and the carbon dioxide being from now on considered as an impurity to be eliminated. The catalyst employed in the apparatus 5 must be of such a nature that the reaction specified shall take place; oxide of iron will serve the purpose. The temperature within the reaction vessels will generally require control and in the apparatus indicated the temperature is maintained at approximately 550° C. by means of the special system devised for this purpose shown more in detail in Fig. 3 in which case, obviously, an appropriate variation in the relation between nitrogen, on the one hand, and hydrogen and carbon monoxide, on the other, must be made at the gas house according to the amount of nitrogen which the heat regulating flame of Fig. 3 introduces into the gases. The requisite heat regulation may, however, be provided if preferred by other suitable means or by electrically heated coils in which latter case there will be no new regulation of the relative proportions of the gases at the gas house.

After the gas mixture leaves the apparatus 5 it is subjected to a series of purification steps. A compressor $f$ compresses the gas to a pressure of approximately 1400 pounds. The gas under this pressure is washed with water in the apparatus 6 with the result that a very large part, in fact nearly all, of the carbon dioxide together with a large proportion of any sulfur impurities which may still be contained in the gas are dissolved in the water and can thus be removed.

The compressed gases are next washed with a hot caustic soda solution e. g. of 20–30% strength, in the system indicated at 7, $7^a$, $7^b$ and 8, the main purpose of which treatment is to remove carbon monoxid due to incomplete combustion in the catalytic combustion chamber 5, although this treatment also removes carbon dioxide or sulfur impurities if still present in the gases. A fine state of subdivision of the caustic is provided for, either by physically subdividing the liquid caustic into spray or fine streams or by distributing the gases through the caustic in the form of small bubbles. The nitrogen-hydrogen gas mixture itself elevates the caustic solution while the latter is then allowed to fall as a fine spray or film in intimate contact with the gas. This is indicated in the drawing (Fig. 1) by showing that the compressed gases after first passing through the heater $7^a$, themselves force the hot caustic upward through the conduit $g$ to the top of the system $7^b$, in which the caustic solution is allowed to fall as a fine spray in such a way as to reach and come very closely into contact with the full volume of gases which may at any moment be contained in said chamber or scrubber 7ᵇ as the result of having risen in the lift g.

From this scrubber the gas under but slightly diminished pressure passes into a condenser 8 which, being cooled causes the water vapor derived from the caustic and accompanying the gases to condense. The condensate is then returned through the conduit h to the caustic solution in the system 7ᵇ, thus preventing the latter from becoming dry.

The gases still under compression as described, are next passed through finely spread or sprayed ammoniacal cuprous carbonate solution in the chamber 9, the object of this treatment being to remove oxygen or carbon monoxid which might still have been present in quantity sufficiently appreciable to deleteriously affect the subsequent catalysis.

Following the foregoing removal, the compressed gases are passed through towers 10 containing soda lime and they pass thence over and through sodium amide, as indicated at 11. These last two stages serve the purpose of similarly removing carbon dioxide and moisture. The resultant gas is an anhydrous mixture of nitrogen and hydrogen in the approximate proportions of one to three by volume, together with a relatively negligible proportion of inert elements such as argon, etc., which are now known to be present in atmospheric air and which were not removed in any of the purification steps heretofore described.

The purified, anhydrous one to three nitrogen-hydrogen gases may pass through the equalizer 12 although they may also be used directly in that part of the apparatus now to be described. In the former case the dry gas is conducted into the equalizer 12 through the conduit i, leaving the same through the conduit j, whereas in the latter operation the gases can pass on directly through the pipe k.

The gas mixture, still under substantially 1400 lbs. pressure as described, is then after being suitably preheated, passed into a specially constructed metallic cylinder 13 containing a catalyst which causes a combination between nitrogen and hydrogen in the form generally considered as $NH_3$, or ammonia. Not all the nitrogen and hydrogen of the gases combine under the conditions of this catalytic action, the result being approximately 8 per cent. by volume of ammonia. The gases which are not combined leave the catalytic chamber accompanied by the ammonia thus produced and together pass into the liquefier 14, in which the ammonia gases, as they are liquefied, separate from the nitrogen-hydrogen gas. The latter, having been unaffected by the reaction in the catalytic chamber 13 but being still in the proper relative proportions the same as the gases passing into the chamber 13 through the conduits j or k, are either treated in a further catalytic system just like 13 or are preferably returned through the connection m and reintroduced, by the pump w to the conduits for gases leading into 13, although they may obviously also be returned to any other part of the prior apparatus or pressure system.

The catalyst itself may suitably be composed of iron, sodium and nitrogen (cf. applicant's Patent No. 1,143,366 of June 15, 1915). The temperature favorable to continuing catalytic reaction as indicated by temperature readings of the incoming and outgoing gases is in the neighborhood of 450° C. (cf. applicant's Patent No. 1,141,947 of June 8, 1915).

The low temperature in condenser 14 may be produced by any standard refrigerating machine, such as e. g. an ammonia-refrigerator.

Gases such as argon, helium, etc., which accompany the nitrogen through the system in very small proportions are considered as inert material. Their volume will, however, increase in proportion to the total volume of nitrogen passing through the system and the ultimate accumulation of such gases naturally takes place in the connection m between the liquefier 14 and the equalizer 12. Accordingly, as indicated at x, these gases may be periodically or otherwise flushed from the system and then be separately collected for use or they may be, in localities where such collection thereof is inconvenient, simply blown off as such, or, since they are accompanied by hydrogen the gas mixture blown off may be used for heating or other purposes.

The liquid ammonia produced as thus far described, which is pure and anhydrous, can be either stored in cylinders 15 or it may be directly employed in the further conversion steps to be described. It may be observed that the entire system thus far described, beginning with the compressor f which is located between the catalytic chamber 5 and the absorber 6, is under very considerable pressure. It is, accordingly, essential that all of the connections between the various units of the entire pressure system shall be constructed so as to avoid any gas leakage. It is extremely important that the system as a whole shall be, with respect to every one of its units, absolutely closed.

The ammonia from the storage cylinders 15 or from some other source as, for example, ammonia from gas liquor or the ammonia from the liquefier 14 or the combination of ammonia from any of said or similar sources, next passes into the system which is adapted to oxidize the ammonia to nitrogen oxides. If ammonia from gas liquor is used, it should first be treated in a suitable tower with a current of steam as indicated at 22 and the gas dried and purified by any standard method as indicated at 23 and 24, inasmuch as the next following steps contemplate the use of an ammonia which is substantially pure and anhydrous. For the purpose of the next following description, it may be assumed that the ammonia as it is obtained from the liquefier apparatus 14, passes directly through the conduit $o$ into the dust remover $16q$ which also performs a mixing function.

In this apparatus 16 the purified ammonia gas is mixed with heated air introduced through conduit $p$ in the proper proportions for combustion (for example, nine volumes of air). These proportions may be conveniently controlled by means of meters. It is important that the gas mixture should be freed from dust and this may be accomplished by passing the gases through layers of asbestos indicated as $q$.

From the dust remover $16q$ the mixed air and $NH_3$ gases pass through pipes whose inner surfaces are nickel or silver or enamel to avoid the formation of any dust, thence passing into the cylindrical converter 17, which is preferably lined with quartz or nickel and contains a platinum catalyst in the form of a fine gauze supported on a number of quartz or nickel rods. In this cylinder 17 the oxidation takes place.

The nitrogen oxides which are thus formed, together with the water vapor which they contain, are next passed through a series of air cooled tubes 18 the temperature of which is controlled to such an extent that the oxides are not cooled below slightly above 100° C. in order that the formation of liquid nitric acid and its resultant destructive action upon the tubes of the cooling apparatus may be avoided.

The cooled gases next pass into a cooler or condenser 19 where final cooling with the resultant formation and condensation of some of the nitric acid takes place. This part of the apparatus and its connections are composed of a substance which resists the destructive action of nitric acid, for which purpose the compositions known as duriron or tantiron (commercial names for high silicon irons) have been found to be satisfactory. The residual gases not condensed in the cooler 19 are mixed with air as indicated at $r$ and are then passed slowly through a series of absorbers 20 which contain water and in which further oxidation and absorption of the nitrogen compounds occurs and in which as the result thereof dilute nitric acid is formed.

The dilute nitric acid from the absorbers 20 is combined with that formed in the condenser 19 as indicated at $s$, and the entire volume of dilute acid is then transferred to near the top of a tower-like distilling apparatus 21, where it is heated, which may be advantageously accomplished by means of hot sulfuric acid introduced at the top of the tower. A current of air (preferably heated) is allowed to pass through the thus vaporizing nitric acid. This current of air carries the distillation products along with it upwardly through the tower. A countercurrent of hot concentrated sulfuric acid enters the upper part of the tower as indicated at $t$ and not only heats the nitric acid and the air but also meets the rising distillation products and removes from them water vapor, thus leaving concentrated nitric acid vapors mixed with air to escape through the conduit $u$ at the top of the tower. These vapors are then cooled in a condenser 25 with the result that a condensate of approximately 97% nitric acid is obtained, the residual air and any accompanying vapor passing out of the condenser through the line $v$.

Having thus described the complete steps in detail by which the nitrogen in the air is converted into strong nitric acid, there remain to be described certain of the details of the apparatus involved with respect to which special features of novelty require a supplemental description. These parts of the apparatus are shown in the additional detail drawings of Figs. 2 to 22.

Referring first to Fig. 2, which illustrates the initial gas producer numbered 1 in Fig. 1, the apparatus consists, generally speaking, of the retort 26 which is filled with coke 27. The coke required is introduced through the aperture 28 which, during the operation of the retort, remains closed. The coke is supported upon a grate 29. In order to bring the coke to the requisite temperature an air blast is introduced through the connection 30 beneath the grate 29. The valve 31 which controls this air blast may conveniently be connected by means of a chain or other suitable means 32 with the valve 33 that controls the waste heat exit pipe 34. The valve 31 and the valve 33 are thus simultaneously opened and closed and when both are open the waste heat escapes to the atmosphere through the stack 35. In the particular apparatus shown the appearance of a clear blue flame just above 34 may serve to indicate that the proper temperature has been reached. When the coke has acquired the proper temperature the valves 31 and 33 are closed and the valves controlling the air line $a$ and the steam line $b$ are opened. In the air line $a$ a meter 36 and in the steam line $b$ a meter 37 control the proper proportions of the gases which are thus introduced to the hot coke, the regulation being such that, together with any nitrogen and products of combustion introduced by the heating flame 53 (Fig. 3) as described, the resulting gas will contain approximately one volume of nitrogen to three volumes of gas composed of hydrogen and carbon monoxid. To assist in securing accuracy in the proper control of the steam and air, it will be found advisable to make check tests on the gas as it comes from the retort. The gases thus produced leave the retort through the gas outlet pipe 38 whence they are carried to the water and iron oxide purifiers already described with respect to Fig. 1. If, by reason of the introduction of the air and steam as described, the coke should lose the degree of heat requisite for a proper continuance of the conversion of the gases, the air and steam lines $a$ and $b$ are temporarily closed while the air blast and waste gas valves 31 and 33 are opened for the purpose of causing the coke to regain the proper temperature. To insure a proper operation of this part of the apparatus a water seal of usual construction is introduced between the exit orifice 38 and the scrubber 2.

Turning next to Fig. 3, 39 represents the catalytic chamber containing iron oxide. The iron oxide rests upon the grate 40 (see Fig. 4) and fills the chamber above the grate 40 up to about 41; the upper part of this chamber is covered by a series of perforated plates 41 resting one upon the other and serving to distribute the gas evenly. The catalytic chamber is made of cast iron and is provided with a pyrometer 42. The outlet for the hot gases, as they leave the catalytic chamber 39, is indicated at 43. The gases consisting largely of a mixture of nitrogen, carbon dioxide and hydrogen, possess a high temperature which is utilized for the purpose of preheating the mixture of gas and steam employed in the catalytic reaction. To this end the hot gases leaving the catalytic chamber 39 through the connection 43, enter the first element of the heat exchange system, leaving it at 44 and so on, through pipes 45 and 46. The pipe 46 leads to the compressor $f$, Fig. 1, and by the time the hot gases from 39 reach this point they have been properly cooled for the purpose of their introduction into the pressure system shown at 6—14, Fig. 1. The heat exchange elements 47 are of ordinary construction. The gas entering by a pipe 48$^a$ flows through the first of them in a direction opposite to that of the hot gases of the lines 43, 44, 45 and 46. The steam travels through pipe 48, and is mixed with gas coming through pipe 49, then through the second of the heat exchangers 47, thence through connection 51 into the next unit of the heat exchange apparatus, and so on, until, through pipe 52, the mixture of preheated steam and gas enters the catalytic chamber 39.

In starting the operation the necessary heat is supplied by heated air from the auxiliary heater 56. After sufficient heat has been generated in this manner the valve 55 is closed and thereafter the system itself, independent of the heater 56, supplies the necessary heat.

It is important that the temperature in the catalytic chamber 39 shall be sufficiently high to be favorable to the reaction. Whenever, therefore, the pyrometer 42 indicates that the temperature is too low, the producer gas burner 53 is employed for the purpose of heating the gases entering the chamber 39 until the heat thus generated is shown by the pyrometer to have been sufficiently elevated, whereupon the producer gas burner is shut off and the flame in the connection 54 extinguished so that thereafter the gases pass through the chamber 39 being heated solely by the heat exchange system already described.

Inasmuch as the gases operated upon in the chamber 39 are poisonous, no leakage should be allowed to occur in the system illustrated in Fig. 3. The relatively high heat, however, which takes place in the apparatus, in connection with the structure of the apparatus itself, tends to cause it to open up at one or more points unless some means are employed to prevent this action. To prevent the occurrence of leakage the chamber 39 is so mounted that it will have in itself a certain freedom of motion. This is accomplished, as shown in Figs. 4 and 5, by setting the chamber upon legs 58 and permitting said legs to rest upon a support with respect to which movement is permitted. As shown in Fig. 5, the legs 58, at their lower ends, are provided with an inset 59 supporting a steel plug 60 having a curved outer face. The curved face of this steel plug rests upon a steel plate 61 set into the flanged support 62, the construction being such as to reduce friction and possess great wearing qualities.

Turning next to Figs. 6 and 7 these relate to the water scrubber (for removing carbon dioxide and sulfur impurities) and its connections generally indicated as 6 in Fig. 1. The scrubber itself is indicated as 63. The gases under approximately 1400 lbs. pressure enter the scrubber through the pressure line 64 and leave the scrubber at 65. The float chamber 66 is connected with the scrubber 63 by means of the pipe 67. The pressure equalizing pipe 68 keeps the level of the liquid indicated at 69 approximately the same with respect to the scrubber 63 and the float chamber 66. The float chamber contains the float 70, preferably composed of steel filled with a material of low specific gravity to prevent collapse, such as cork, the bottom of which is connected by means of links 71 and 72 with the rock shaft 73. The rock shaft 73 will be actuated as the float rises or falls. This rock shaft penetrates the walls of the float chamber terminating at the exterior in a toothed wheel 74, capable of supporting and operating a chain drive. This chain drive controls an oil pressure governor of the Pelton type, which being known, is not illustrated, the function of which is to control the volume of water from the pipe 75 to a Pelton water wheel of known construction. This control of the escaping volumes of water is usually exercised by the employment of a needle valve and by controlling the position of the needle. By making use of the Pelton water wheel for the purpose of taking up the flow of fluid from the scrubber 63, the great pressure behind this fluid can be converted into energy by connecting the shaft of the Pelton wheel with an electric generator. As the float 70 rises in the float chamber 66 (which means that an excessive amount of water is accumulating in the scrubber 63) the rock shaft 73 causes an enlargement of the needle valve aperture which connects pipe 75 with the water wheel, thereby allowing a greater escape of fluid into the water wheel from the pipe 67, 75. This causes the fluid level 69 to become lowered, thereby causing the float 70 to descend with the result of moving the rock shaft in the opposite direction and of causing its connections to reduce the aperture of the needle valve in the connection between 75 and the water wheel thereby checking the flow of liquid.

Referring next to Fig. 8, this figure shows the manner in which the joints or unions in the entire pressure system are made. As shown in Fig. 8, the abutting pipes 76 terminate exteriorly in threads 77. The forward edges of the pipes 76 are machine, one of these edges being thus provided with a projection 78 while the co-operating pipe similarly terminates in a corresponding annular depression. This depression carries a copper gasket 80. Each of the threads 77 at the outer periphery of each pipe carries an annular flange 81 screwed thereon and two adjacent flanges 81 are then connected by means of bolts 82 and nuts 83. When the nuts are tightened and the copper gasket 80 thereby compressed between the faces 78, 79 of abutting pipes, a joint is formed which has proven very satisfactory and which effectually resists the action of the great pressure under which the system is operated. On all hot joints it is of advantage to use bolts composed of nickel steel containing 3% nickel which will not "freeze" on the nut.

Turning next to Figs. 9 and 10, these represent the caustic soda scrubbing apparatus and illustrate the manner in which the operations shown diagrammatically in 7, 7ª, 7ᵇ and 8 (Fig. 1) are carried on.

In Fig. 9, 84 illustrates the storage tank for fresh caustic soda (NaOH) of approximately 25% strength. This caustic solution passes through a pump 85 whereby it is subjected to the pressure of the system, to wit, approximately 1400 lbs. The caustic next passes through an accumulator 86, the weighted piston of which assures a constant pressure. From the accumulator the caustic passes to heater 87 which imparts to the fluid a temperature of approximately 250° C. From this heater 87 a continuous supply of fresh caustic is constantly added at the point 88 to the caustic solution in circulation in the balance of the apparatus, thereby maintaining in the circulating solution not only a more or less constant heat but also a condition in which the solution itself is maintained at 80% of its saturation point with respect to carbon monoxid.

The hydrogen-nitrogen gases enter the caustic system through the pipe 89 at the left hand side of Fig. 9. Check valves on this gas line are provided for the purpose of forestalling and equalizing any sudden or violent pressure fluctuations. These gases containing perhaps 2% CO pass through the heater 90, in which their temperature is elevated to about 250° C. The hot gases then pass through the pipe 91 and then after passing through the treatment to be subsequently explained with respect to Fig. 10, enter the gas lift 92, said lift being supplied with hot caustic solution from the heater 93. The gases rise through the said solution in the lift pipe 94 and exercise an elevating influence upon the fluid, thereby causing it to rise in the lift pipe 94 and thence into the scrubbing tower 95. This tower 95 is filled with pieces of cast iron over and through which the hot caustic solution trickles in a very fine state of division, being accompanied by the gases under treatment which are thus subjected to a thorough scrubbing with caustic, the latter removing from the gas mixture practically its total percentage of CO. From the scrubbing tower 95 the liquid and gases pass through the connection 96 into the vessel 97, which latter contains a constant supply of caustic solution for the purposes of circulation. This solution is, of course, constantly freshened with the fresh caustic, which is introduced at 88. The purified nitrogen-hydrogen gases pass out of the vessel 97 through pipe 98 and thence through the cooler 99 which condenses therefrom any steam which may have been carried along by the hot gases as the result of their passing through the caustic solution. The condensed steam is collected at 100 and passes through the trap 101 and pipe 102 back into the caustic solution contained in the vessel 97 while the dried and purified nitrogen-hydrogen gases pass out of this system at 103. The addition of the condensed steam to the caustic solution in the vessel 97 exercises a certain cooling effect upon the caustic in said vessel which effect is, however, compensated for by the heat supplied by the incoming hot fresh caustic solution at the bottom of the vessel 97. The cooler or condenser 99 is the condenser shown as 8 of Fig. 1.

The level of the solution in vessel 97 is maintained by the connection 104 which leads from vessel 97 to vessel 105. This vessel 105 contains a storage supply of the spent caustic solution. In order to prevent the level of the spent solution from rising above the connection 104, the contents of chamber 105 is controlled by the float chamber 106, the float in which is connected with the valve 108 by means of an electric control 107. The valve regulates the quantity of spent caustic to be withdrawn from the system, the amount thereof being regulated in accordance with the level of the float in the float chamber. The electric control is such that as the float rises, indicating an excessive accumulation of spent caustic in the vessel 105, the valve 108 will be opened to a greater extent to permit a more rapid withdrawal of the solution, whereas the said valve is brought nearer the closing position whenever the float sinks, thus indicating that there is an insufficient accumulation of spent caustic in the vessel 105. High heat in the float chamber is harmful and the spent caustic solution, consequently, passes through a cooler located between the vessel 105 and the float chamber 106. The spent caustic solution goes into the storage tank 109. From this point it may be taken and regenerated (with or without the separation of formic acid or formates or oxalic acid or oxalates) and returned with no substantial loss of caustic to the supply of fresh caustic in the storage tank 84.

Returning now to that part of Fig. 9 in which the unpurified hot gases pass from the pipe 91 to the lift 94, this detail is illustrated in Fig. 10. In that figure it is shown that the hot gases pass through a supply of hot caustic solution in the vessel 111 which caustic solution passes thence through connection 114 to nozzle chamber 92 while the hot gases from 91 passing upwardly through the caustic in 111 enter the nozzle 113. The solution in this vessel is continuously supplied through the pipe 110 which leads from the heater 93 (Fig. 9). The caustic passing through said heater is supplied through the connection 112 (Fig. 9) which is interposed between the heater 93 and the incoming supply of caustic at 88.

It will be observed that the use of all valves and stuffing boxes is avoided. This valveless system is furthermore automatically protected against complete dependence upon the pump 85 by reason of the fact that the storage chamber 97 is capable of keeping the system supplied automatically for several hours even though the pump 85 should break down altogether, thus affording an opportunity, without interruption of the system as a whole, to make the necessary repairs on the pump or to connect the system to another pump of the same capacity.

The various heaters, 90, 93, 87, are preferably made of drawn seamless chrome vanadium steel tubing, a metal which in this art has been found to be of special value with respect to the particular process under consideration both at this point and at other points in the apparatus, chrome vanadium steel and tungsten steel being both suitable while other compositions heretofore tried have had to be discarded. With respect to the heater 93, it should be stated that one of its functions is to replace heat radiated by the apparatus.

Turning next to Fig. 11, this figure shows the detail of the diagrammatic representation, indicated as 9 on Fig. 1, with respect to the treatment of the hydrogen-nitrogen gases with cuprous ammonium carbonate. The object of this treatment is to take up infuriously active amounts of CO and oxygen which may still be carried by the gases.

Strong ammonia water is saturated with ammonium carbonate and this solution circulated on copper filings or borings and oxygen or air bubbled through, until say 2½ per cent. by weight of the liquid is copper, i. e. in the cupric state, and then the oxygen or air supply is shut off and the liquid allowed to circulate with nitrogen until the copper content rises to approximately 5 per cent., i. e. in the cuprous state. An efficient absorber will thus be produced which is made use of in the apparatus illustrated in Fig. 11. In that figure the supply of cuprous carbonate in $NH_4OH$ solution comes from the storage tank 115 and passes thence through pump 116 and the accumulator 117 into the top of the tower 118. This tower is packed with coke. The hydrogen-nitrogen gases enter through the connection 119, pass upwardly through the coke thus meeting the ammoniacal cuprous carbonate and are thereby freed of injuriously active amounts of CO which may still be present in the gases. When thus purified the gases pass out of the tower 118 through the pipe 120 which leads through a cooler to condense out the water vapor. From the cooler the condensed liquid is returned to the tower 118 while the cooled and purified gases pass to the next set of purifiers (10 and 11, Fig. 1) through the outlet end of pipe 120 marked with an arrow in Fig. 11. The ammoniacal cuprous carbonate solution, together with the absorbed CO, pass into the vessel 121 and thence through the overflow connection 122 into the vessel 123. This latter vessel is connected with the float chamber 124, the float in which is connected with the electrically controlled valve 125. The operation of these parts of the apparatus is similar to that described with respect to corresponding apparatus 105, 106, 107 and 108 of Fig. 9. The solution after passing the valve 125 enters either one or the other of the storage tanks 126, 127. As soon as one of these two tanks is filled the other one is connected while the contents of the former is readily regenerated by being heated to approximately 70° C., whereupon it is again in a condition to be returned to the circulatory system, which is accomplished by means of the connection 128. With care this solution ought to last indefinitely but through faulty manipulation permitting access of air or the like, replenishment with a fresh supply of this material may become necessary.

Passing next to Figs. 12, 13, 14 and 15, these relate to the ammonia catalyst apparatus represented diagrammatically as 13 in Fig. 1. The catalytic chamber is indicated as 129. Chrome vanadium steel or tungsten steel are capable of satisfying the requirements of such an apparatus and I, therefore, employ such materials. The outer shell of the catalytic chamber 129 has a cylindrical configuration, the shell being open at both ends. Into each end is then set a massive head 130, said heads being retained in position by breech screws 131. The two heads 130 are centrally apertured, as indicated, to receive the top and bottom stems of the catalyzing chamber proper. The plate 132 of relatively small diameter closes the upper aperture of the casing 129 and can be bolted thereto. Set within this casing is the catalyzing vessel 133, composed of a shell and a loose dome-like top therefor, and this vessel contains the pipe system in which the catalytic material is carried. The lower part of the vessel 133 extends into a stuffing box containing asbestos packing 136 held in place by a loose iron gland 137. The nitrogen-hydrogen gases (preheated as hereinafter described) enter the catalytic chamber through pipe 138 and pass upwardly around the pipes 134 in unrestricted thermal contact therewith, whereby the gases are preheated to substantially the temperature necessary for the reaction which occurs when the gases come into direct contact with the catalyst. After these gases have risen into the dome 135 they progress downwardly through the catalyst in the tubes 134. The gases in this way pass through a mass or body of catalyst material being spaced therefrom by the metal walls of the tubes or pipes 134. In other words, the gases in the interior of the catalyst chamber pass through a space which includes a gas space located between the center of the catalyst chamber and the outermost parts of the catalytic material in the chamber. The gases converted by this process, together with the gases which remain unaffected by the catalyst, leave the catalytic apparatus through the connection 139 which communicates with the interior of the apparatus through a plate, bolted to the apertured head 130, similar to the plate 132 at the top. Means are provided, as for example, where the dome shaped top rests on the shell 133, whereby said shell may be permitted to be jacketed and enveloped by an atmosphere consisting of the gases under treatment. The upper plate 140 which holds the tubes 134 in place, is perforated while the lower plate 141 is imperforate.

Inasmuch as the gases which leave the catalytic apparatus contain a large amount of heat, it is advisable to utilize this heat before subjecting the gases to the refrigeration necessary for abstracting therefrom the ammonia which has been formed. In starting the apparatus auxiliary or added heat must be resorted to. Accordingly (see Fig. 15) when the apparatus is first started the incoming gases, represented by the arrows moving from left to right, have not acquired any heat from the preheaters 150 so that valve 144 is closed and valve 143 opened in order to permit the incoming hydrogen-nitrogen gases to pass through the heater 142 and thence into the catalytic apparatus 129. After the process has begun to function and the catalytic chamber 129 has developed sufficient heat, the valve 144 is opened and the valve 143 closed, thus eliminating the heater 142 from further activity in the system. From now on the hot gases from the catalytic apparatus 129 pass, as indicated, by arrows moving from right to left through a series of heat exchangers 150 and therein supply sufficient heat to the incoming gases which travel in the opposite direction. A general view of the interior of one of the heat exchangers 150 is shown in Fig. 12. Each unit of the heat exchange system receives hot gases through a pipe corresponding to 139 (Fig. 12). These hot gases are allowed to travel through passages of very restricted dimensions while a correspondingly thin annular body of gas, passing in the opposite direction, takes up heat therefrom. A structure which is adapted to the end in view is shown in detail in Figs. 13 and 14. Instead of the usual construction of heat exchange apparatus, there are here shown three concentric tubes, of which the central one is closed at the lower end so as to act as a plug or means to restrict the passage through which the gases can flow. The central tube is indicated at 145. Surrounding the tube 145 is the tube 146 and between the two tubes 145 and 146 is thus formed the annular passage for gases traveling in one direction. A third tube 147 surrounds tube 146 and thus forms between itself and tube 146 the second annular passage through which the gases may pass in an opposite direction from that in which the gases travel in the annular space between the tubes 145 and 146. The spaces between the exterior of one tube and the interior surface of the surrounding tube may be restricted to one-eighth of an inch or thereabouts, dimensions such that a very great increase of speed is brought about, while the transference of heat from a thin film of gas to an adjoining equally thin film of gas greatly facilitates the operation. The tube 145 is welded to its surrounding tube 146 at the upper part of the apparatus while it hangs free at the bottom. In order to permit the gases to communicate with their respective annular passages at the upper parts of the tubes, the construction of Fig. 14 is preferably employed in which the apertures 148 establish the necessary means of communication. It is immaterial through which of the annular passages the respective gases travel and in Figs. 12 and 13 the travel is indicated as leading the hot gases from the catalyst through 139 into the connection 149, thence upwardly through the annular passage between tubes 145 and 146 while the opposite incoming gases travel downwardly through the annular passage between tube 146 and tube 147, being thence withdrawn through the connection 151 into the pipes 138 and thence into the catalytic chamber 129. The gases entering this catalytic system, as indicated at K in Fig. 15, are, of course, those which have passed through the system shown in Fig. 1 through the stage indicated at 11 in that figure. Such nitrogen-hydrogen gases as are left unaffected after passing through the liquefier are admitted at 152. The gases from the catalyst leaving the catalytic system at 153 (Fig. 15) lead to the ammonia liquefier shown more in detail in Fig. 16.

Turning next to Fig. 16, the apparatus represents generally the ammonia condenser. The gases from the ammonia catalyst having passed from the catalytic system at 153, Fig. 15, enter the top header 155 of the ammonia condenser 156 through pipe 154. The header 155 is connected with a series of coils, shown in the drawings as seven in number, the coils being indicated as 157. The lower part of each coil is connected with the bottom header 158. The coils are surrounded by a refrigerating medium which enters the condenser 156 at 159 and leaves the condenser at 160. The temperature of the refrigerating medium is such as to condense out of the gases in the coils ammonia that may have been formed as the result of the catalytic treatment as carried out in the apparatus shown in Fig. 12. The uncondensed gases together with the liquefied ammonia pass from the bottom header 158 through the separator 161 being returned to the heater system 150 (Fig. 15) by means of a circulating pump w. The liquid ammonia is continuously withdrawn from the separator 161, the amount of such withdrawal being controlled by the float chamber 163, the float in which, as in the previous cases in which similar apparatus has heretofore been described in connection with this system, is connected with a three-phase squirrel cage reversible alternating current motor 164 which in turn controls, according to the height of the float in the float chamber, the position of the reducing valve 165. The liquid or condensed ammonia here under 200 lbs. pressure passes through the sight glass 167 and accumulates in the storage vessel 168 leading thence through the connection 169 to the valve 170 which reduces the pressure to approximately 30" of water just prior to the entry of the NH₃ into the dust removing vessel of the nitric acid system shown as 16 in Fig. 1. The refrigerating medium, preferably NH₃, which circulates about the coils 157 in the ammonia condenser may conveniently constitute part of a system which is more or less independent of the general system heretofore described. This special circulating system for the refrigerating means is shown in Fig. 17 in which 156 indicates the exterior of the ammonia condenser into which the refrigerating medium enters at 159 after passing the expansion valve 172 by means of which expansion the desirable degree of low temperature is produced. When the refrigerating medium has arrived at the top of the condenser 156 it leaves the same through the pipe 160 after which it is again subjected to compression by the use of the pump 173. This pump compresses the medium (in this case ammonia) to approximately 175 lbs. after which it passes through the coil 174 of the cooler 175, being then collected in the form of liquid ammonia in the chamber 176. This chamber supplies the line 177 with compressed fluid which, in passing the valve 172, is allowed to expand and to reassume gaseous form, pressure being reduced by said valve to about 10 lbs.

Turning next to Figs. 18, 19 and 20, 180 represents the conduit through which the expanded and filtered ammonia gases from the preceding system, mixed with heated air, as indicated in the system 16—17 (Fig. 1), enter the catalytic part of the oxidizing system. The mixed gases pass through the chamber 181 which, as shown in detail in Fig. 19, is filled with a series of perforated plates 181ª set one above the other, thereby assuring an intimate mixture of the gases. From the chamber 181 the gases pass through the conduit 182 into the vestibule 183 and then downwardly through the catalytic chamber 184. This latter chamber, as shown in detail in Fig. 20, is provided with a quartz lining 185, the platinum catalyst being shown as 186 and consisting of a series of layers of fine gauze supported on quartz rods 187. The chamber is provided with a pyrometer 190 and temperature controlling devices 188, 191. The result of the catalytic action which takes place in the cylinder 184 is to oxidize the ammonia gases to nitrogen oxides. These oxides, together with the water vapor which is formed, are led from the cylinder 184 to a connection between its outlet 192 and the inlet 193 (Fig. 21) into the temperature reducer 18 of Fig. 1. This latter apparatus is shown more in detail in Fig. 21. It consists of a shell 194 which contains a series of tubes 195 for the passage therethrough of the oxides. The air enters this apparatus at 196, flows around the series of tubes 195 and emerges at 197. The oxides etc. entering this apparatus 193 flow through the tubes 195, leaving the apparatus at 198. The regulation of air is such that the gases are cooled to a considerable extent, say to a temperature of 125° C. but not less than 100°, because at the latter temperature nitric acid would condense and destroy the apparatus. From the temperature reducer, shown in Fig. 1, the gases pass into vessels composed of metal which resists the action of nitric acid and in which such part of the nitric acid as can be extracted by condensation is first removed from the gases while the balance of the gases pass into absorbers in which the remaining nitrogen oxides are caused to be absorbed by water. The nitric acid thus obtained by condensation, as well as that obtained by absorption, is then mixed, the result being a dilute $HNO_3$. This part of the system is sufficiently illustrated at 19 and 20 in Fig. 1.

In order that the system shall produce nitric-acid of substantial concentration, i. e. approximately 97%, it is necessary to provide means for converting the dilute nitric acid into concentrated nitric acid and for this purpose the concentrator, shown in detail in Fig. 22, is made use of. In this apparatus a suitably lined tower 199 is provided with a plate 200, shaped into the form of a series of connected pans, each of which is arranged to be capable of permitting an overflow into adjacent pans as shown, for example, at 202. The pans are also arranged to permit an overflow into the tower itself, as shown at 201. The pan-shaped recesses are filled with strong hot sulfuric acid through 203. This hot sulfuric acid trickles down through the tower. Below the top of the tower a second series of similar pans 204 are arranged to receive the dilute nitric acid as collected from the preceding portions of the entire system hereinabove described, said dilute nitric acid being introduced through the connection 205. The nitric acid in these pans or in the overflow from the pans 204 is vaporized by the heat in the tower and thus converted into vapors of water and of nitric acid. The strong sulfuric acid, which is a very ready absorber of water, retains the water vapors thus liberated from the dilute nitric acid, with the result that the sulfuric acid as it passes downward through the tower becomes dilute. The nitric acid, on the other hand, freed from its water vapor, rises to the top of the tower and passes out of it at 206 in a condition in which it is practically dry. The dilute sulfuric acid is withdrawn at 207. It may be again concentrated and used for further operations in this tower. Air, preferably dry, is admitted through the connections 208; it is advisable to preheat this air. This air in the tower assists in conveying the nitric acid vapor upwardly and out of the concentrator; and the nitric acid which leaves the concentrator at 206, can be readily condensed in a suitable apparatus, indicated at 25 in Fig. 1. The result of this condensation is a nitric acid of approximately 97% strength.

From the foregoing description it will be observed that complicated as the details may appear, the process as a whole is extremely simple and in broad outline may be described as progressing from the raw material of air, steam and coke through to concentrated nitric acid in a practically automatic way and on a line which, disregarding purification steps and the like, proceeds from the gas producer 1 (Fig. 1) to the catalytic hydrogen generator 5 (Fig. 1), thence to the catalyst 13 (Fig. 1) for causing nitrogen and hydrogen to combine, thence to the catalyst 17 (Fig. 1) to disengage combined hydrogen and to replace it with oxygen and finally into the concentrator 21 (Fig. 1) from which the pure, concentrated nitric acid gases free from water are obtained.

I claim:

1. In the art of converting atmospheric nitrogen into a compound containing combined nitrogen, that improvement which comprises heating a carbonaceous material and introducing to it steam, adding air to the gas thus produced both steam and air being supplied in such regulated quantities as to obtain a gas in which the nitrogen content by volume is approximately one-third of the sum of the hydrogen and carbon monoxide contents by volume.

2. In the art of converting atmospheric nitrogen into a compound containing combined nitrogen, that improvement which comprises heating a carbonaceous material and introducing to it steam and a gas mixture containing nitrogen and oxygen, said gases being introduced in such regulated quantities as to obtain a gas in which the nitrogen content by volume is approximately one-third of the sum of the hydrogen and carbon monoxide contents by volume.

3. In the art of converting atmospheric nitrogen into a compound containing combined nitrogen, that improvement which comprises heating a carbonaceous material and introducing to it steam adding air to the gas thus produced, both steam and air being supplied in such regulated quantities as to obtain a gas in which the nitrogen content by volume is aproximately one-third of the sum of the hydrogen and carbon monoxide contents by volume, then treating the resulting gas mixture until the same contains nitrogen and hydrogen in the proportion of approximately one to three and then subjecting the resulting gas mixture to pressure, and under said pressure eliminating associated substances capable of injuriously affecting the ammonia catalyst while maintaining in the gas mixture the initially established ratio as between nitrogen and hydrogen, and then, when the gas mixture contains substantially only nitrogen and hydrogen in said ratio, causing synthesis of said nitrogen and hydrogen under pressure to form ammonia.

4. In the art of converting atmospheric nitrogen into a compound containing combined nitrogen, that improvement which comprises heating a carbonaceous material and introducing to it steam, adding air to the gas thus produced, both steam and air being supplied in such regulated quantities as to obtain a gas in which the nitrogen content by volume in approximately one-third of the sum of the hydrogen and carbon monoxide contents by volume, introducing into said gas mixture a regulated quantity of steam and converting the carbon monoxide into carbon dioxide and part of the steam into hydrogen, the regulation being such that the resultant gas mixture shall contain nitrogen and hydrogen in the proportion of approximately one to three and then purifying said mixture until it contains nitrogen and hydrogen in the said proportions and then subjecting the resulting gas mixture to pressure, and under said pressure eliminating associated substances capable of injuriously affecting the ammonia catalyst while maintaining in the gas mixture the initially established ratio as between nitrogen and hydrogen, and then, when the gas mixture contains substantially only nitrogen and hydrogen in said ratio, causing synthesis of said nitrogen and hydrogen under pressure to form ammonia.

5. In the art of converting atmospheric nitrogen into a compound containing combined nitrogen, that improvement which comprises heating a carbonaceous material and introducing to it steam, adding air to the gas thus produced, both steam and air being supplied in such regulated quantities as to obtain a gas in which the nitrogen content is less than one-third by volume while the remainder of the gas contains hydrogen and a gas capable of causing the formation of further volumes of hydrogen when mixed with steam in the presence of a catalyzer, the sum of the volume of the hydrogen first produced and of said other gas being approximately three times the volume of the nitrogen.

6. In the art of converting atmospheric nitrogen into a compound containing combined nitrogen, that improvement which comprises heating a carbonaceous material and introducing to it steam, adding air to the gas thus produced, both steam and air being supplied in such regulated quantities as to obtain a gas in which the nitrogen content by volume is aproximately one-third of the sum of the hydrogen and carbon monoxide contents by volume and utilizing the carbon monoxide as a means for causing the introduction into the mixed gases of a substantially equal volume of hydrogen.

7. In the art of converting atmospheric nitrogen into a compound containing combined nitrogen, that improvement which comprises heating a carbonaceous material, introducing to it steam and air in such regulated quantities as to obtain a gas in which the nitrogen content by volume is approximately one-third of the sum of the hydrogen and carbon monoxide contents by volume, treating the resulting gas with a means for removing solid matter (dust, etc.) and a substantial part of the sulfur bearing components, collecting and storing the gases in containers of substantially large volume and withdrawing gas therefrom in a continuous manner and utilizing its carbon monoxide as a means for causing the introduction into the mixed gases of a substantially equal volume of hydrogen.

8. In the art of converting atmospheric nitrogen into a compound containing combined nitrogen, that improvement which comprises heating a carbonaceous material, introducing to it steam and air in such regulated quantities as to obtain a gas in which the nitrogen content by volume is approximately one-third of the sum of the hydrogen and carbon monoxide contents by volume and when the carbonaceous material cools, shutting off the supply of steam and admitting air alone to heat it up again and then again admitting said regulated quantity of steam and air.

9. In the art of converting atmospheric nitrogen into a compound containing combined nitrogen, that improvement which comprises heating a carbonaceous material, introducing to it steam, adding air to the gas thus produced, both steam and air being supplied in such regulated quantities as to obtain a gas in which the nitrogen content by volume is approximately one-third of the sum of the hydrogen and carbon monoxide contents by volume, utilizing the carbon monoxide as a means for causing the introduction into the mixed gases of a substantially equal volume of hydrogen, subjecting the gas to pressure and under such pressure removing therefrom in several connected stages all constituents injurious to the catalysis of nitrogen and hydrogen, whereby a gas mixture of approximately ¼ nitrogen and ¾ hydrogen free from oxygen (and its compounds, such as carbon monoxide, moisture or water vapor,) and from sulfur (and its compounds such as hydrogen sulfide and sulfur containing material) is obtained and passing the result over a catalyst capable of causing nitrogen and hydrogen to combine to ammonia.

10. In the art of converting atmospheric nitrogen into a compound containing combined nitrogen, that improvement which comprises heating a carbonaceous material, introducing to it steam, adding air to the gas thus produced, both steam and air being supplied in such regulated quantities as to obtain a gas in which the nitrogen content by volume is approximately one-third of the sum of the hydrogen and carbon monoxide contents by volume, utilizing the carbon monoxide as a means for causing the introduction into the mixed gases of a substantially equal volume of hydrogen, subjecting the gas to considerable pressure but below 100 atmospheres and under such pressure removing therefrom in several connected stages all constituents injurious to the catalysis of nitrogen and hydrogen, whereby a gas mixture of approximately ¼ nitrogen and ¾ hydrogen free from oxygen (and its compounds, such as carbon monoxide, moisture or water vapor,) and from sulfur (and its compounds such as hydrogen sulfide or sulfur containing material) is obtained and passing the result under said pressure over a catalyst capable of causing nitrogen and hydrogen to combine to ammonia.

11. In the art of converting atmospheric nitrogen into a compound containing combined nitrogen, that improvement which comprises heating a carbonaceous material, introducing to it steam, adding air to the gas thus produced, both steam and air being supplied in such regulated quantities as to obtain a gas in which the nitrogen content by volume is approximately one-third of the sum of the hydrogen and carbon monoxide contents by volume, utilizing the carbon monoxide as a means for causing the introduction into the mixed gases of a substantially equal volume of hydrogen, subjecting the gas to pressure and under such pressure removing therefrom in several connected stages all constituents injurious to the catalysis of nitrogen and hydrogen, whereby a gas mixture of approximately ¼ nitrogen and ¾ hydrogen free from oxygen (and its compounds such as carbon monoxide, moisture or water vapor) and from sulfur (and its compounds such as hydrogen sulfide or sulfur containing material) is obtained and passing the result under said pressure over a catalyst capable of causing nitrogen and hydrogen to combine to ammonia, separating the ammonia thus formed from the non-converted mixture of nitrogen and hydrogen and reintroducing said non-converted gases into the system for resubmission to the ammonia catalyst.

12. In the art of converting atmospheric nitrogen into a compound containing combined nitrogen, that improvement which comprises heating a carbonaceous material, introducing to it steam, adding air to the gas thus produced, both steam and air being supplied in such regulated quantities as to obtain a gas in which the nitrogen content by volume is approximately one-third of the sum of the hydrogen and carbon monoxide contents by volume, utilizing the carbon monoxide as a means for causing the introduction into the mixed gases of a substantially equal volume of hydrogen, subjecting the gas to pressure and under such pressure removing therefrom in several connected stages all constituents injurious to the catalysis of nitrogen and hydrogen, whereby a gas mixture of approximately ¼ nitrogen and ¾ hydrogen free from oxygen (and its compounds such as carbon monoxide, moisture or water vapor) and from sulfur (and its compounds such as hydrogen sulfide or sulfur containing material) is obtained and passing the result under said pressure over a catalyst capable of causing nitrogen and hydrogen to combine to ammonia, separating the ammonia thus formed from the non-converted mixture of nitrogen and hydrogen and reintroducing said non-converted gases into the system for resubmission to the ammonia catalyst and removing from said non-converted gas mixture, accumulated inert rare gas.

13. In the art of converting atmospheric nitrogen into a compound containing combined nitrogen, that improvement which comprises heating a carbonaceous material, introducing to it steam, adding air to the gas thus produced, both steam and air being supplied in such regulated quantities as to obtain a gas in which the nitrogen content approximates 20–25% by volume, causing an increase in the volume proportion of the hydrogen until the same shall approximate three times that of the nitrogen, subjecting the said gas mixture to pressure and under said pressure purifying the gases until all constituents injurious to the catalysis of nitrogen and hydrogen are eliminated while maintaining the previously established ratio between nitrogen and hydrogen and passing the result over a catalyst capable of causing nitrogen and hydrogen to combine to ammonia.

14. In the art of converting atmospheric nitrogen into a compound containing combined nitrogen, that improvement which comprises heating a carbonaceous material, passing steam therethrough, collecting the gases produced and causing the introduction therein of constituents to produce a relation between the hydrogen and the nitrogen contents in said gases of three to one by volume, subjecting said gases to pressure and thereupon under pressure removing therefrom in several connected stages without intermediate release of pressure all constituents injurious to the catalysis of nitrogen and hydrogen, said stages including treatment of the gases with water and a chemical solution adapted to remove carbon monoxide and final treatments for the removal of residual impurities and then without intermediate release of pressure subjecting the result under pressure appropriate for the synthesis of ammonia to a catalyst capable of causing nitrogen and hydrogen to combine to ammonia.

15. In the art of converting atmospheric nitrogen into a compound containing combined nitrogen, that improvement which comprises heating a carbonaceous material, passing steam therethrough, collecting the gases produced and causing the introduction therein of constituents to produce a relation between the hydrogen and the nitrogen contents in said gases of three to one by volume, said step including the passage of the gases over a heated catalyzer in the presence of steam to replace carbon monoxide by hydrogen, subjecting said gases to pressure and thereupon under pressure removing therefrom in several connected stages without intermediate release of pressure all constituents injurious to the catalysis of nitrogen and hydrogen, said stages including treatment of the gases with water and a chemical solution adapted to remove carbon monoxide and final treatments for the removal of residual impurities and then without intermediate release of pressure subjecting the result under pressure appropriate for the synthesis of ammonia to a catalyst capable of causing nitrogen and hydrogen to combine to ammonia.

16. In the art of converting atmospheric nitrogen into a compound containing combined nitrogen, that improvement which comprises heating a carbonaceous material, passing steam therethrough, collecting the gases produced and causing the introduction therein of constituents to produce a relation between the hydrogen and the nitrogen contents in said gases of three to one by volume, subjecting said gases to pressure and thereupon under pressure removing therefrom in several connected stages without intermediate release of pressure all constituents injurious to the catalysis of nitrogen and hydrogen, said stages including treatment of the gases with water and a chemical solution adapted to remove carbon monoxide and final treatments for the removal of residual impurities and then without intermediate release of pressure subjecting the result under pressure appropriate for the synthesis of ammonia to a catalyst capable of causing nitrogen and hydrogen to combine to ammonia, and removing from the gases not converted by the catalytic treatment accumulated inert rare gas.

17. In the art of converting atmospheric nitrogen into a compound containing combined nitrogen, that improvement which comprises heating a carbonaceous material and introducing to it steam in regulated quantities, adding to the gas thus produced air in regulated quantities, treating the resultant gas for replacement of its carbon monoxide by hydrogen and producing a gas mixture which, except for rare inert gases, contains nitrogen and hydrogen alone and in proportions adapted for complete combination into ammonia upon submission to a catalyst.

18. In the art of converting atmospheric nitrogen into a compound containing combined nitrogen, that improvement which comprises heating a carbonaceous material and introducing to it steam in regulated quantities, adding to the gas thus produced air in regulated quantities, treating the resultant gas for replacement of its carbon monoxide by hydrogen and producing a gas mixture which contains nitrogen and hydrogen in proportions adapted for complete combination into ammonia, subjecting said gases to pressure and while under said pressure first removing from the gases ingredients injurious to the catalysis of nitrogen and hydrogen to ammonia and then conducting the catalytic reaction.

19. In the art of converting nitrogen into a compound containing combined nitrogen, that improvement which comprises preparing a mixture of gases containing nitrogen and hydrogen in the approximate volume relation of one to three, subjecting the said gas mixture to pressure and under such pressure removing therefrom in several connected stages all constituents injurious to the catalysis of nitrogen and hydrogen until there is obtained a gas mixture of approximately ¼ nitrogen and ¾ hydrogen free from oxygen (and its compounds such as carbon monoxide, moisture or water vapor) and from sulfur (and its compounds such as hydrogen sulfide or sulfur containing material) and passing the result over a catalyst capable of causing nitrogen and hydrogen to combine to ammonia.

20. In the art of converting atmospheric nitrogen into a compound containing combined nitrogen, that improvement which comprises subjecting a gas mixture containing nitrogen and hydrogen in the proportion of one volume of nitrogen to three volumes of hydrogen to approximately the catalyzing pressure, conducting a series of successive treatments on the said gas while under the catalyzing pressure, said treatment being effective to purify the gas mixture by elimination of ingredients deleterious to the catalysis and to bring the gas mixture to a condition appropriate for the subsequent catalysis of nitrogen and hydrogen contained in the mixture and then passing the so treated gas under said catalyzing pressure over a catalyst capable of causing nitrogen and hydrogen to combine to ammonia.

21. In the art of converting atmospheric nitrogen into a compound containing combined nitrogen, that improvement which comprises subjecting a gas mixture containing nitrogen and hydrogen in the proportion of one volume of nitrogen to three volumes of hydrogen to approximately the catalyzing pressure, passing the gas mixture under said pressure over a catalyst capable of causing nitrogen and hydrogen to combine to ammonia, extracting the ammonia formed, merging the unconverted portions of the gas mixture with fresh gas mixture on its way to the catalyst, causing circulation of the merged gas streams through the catalytic cycle, to wit, through the catalyst, through the ammonia extraction stage and past the gas-merging point, by the application of supplemental pressure requisite to restore, in the merged stream, the initially established catalyzing pressure and to effect the circulation through the catalytic cycle, and subjecting the fresh gas mixture between the first application of the catalyzing pressure and the subsequent application of the pressure required for circulation, to a series of successive manipulations effective to purify the gas mixture by elimination of ingredients deleterious to the catalysis and to bring the gas mixture to a condition appropriate for the subsequent catalysis of nitrogen and hydrogen contained in the mixture.

22. In the art of converting atmospheric nitrogen into a compound containing combined nitrogen, that improvement which comprises subjecting a gas mixture containing nitrogen and hydrogen in the proportion of one volume of nitrogen to three volumes of hydrogen to approximately the catalyzing pressure, performing upon the said gas, while under said catalyzing pressure, a series of successive treatments to remove therefrom substantially all of each of the constituents injurious to the ammonia catalyst, including water vapor, and passing the said treated gas while under approximately the aforesaid catalyzing pressure to a catalyst capable of causing nitrogen and hydrogen to combine to ammonia.

23. The method of producing ammonia by the use of atmospheric nitrogen which comprises producing from carbonaceous fuel, air, and water, a gas mixture containing nitrogen, hydrogen, and carbon monoxide, subjecting said gas mixture to catalytic treatment with steam to cause replacement of the CO by equivalent volumes of hydrogen, regulating the conduct of the foregoing operations so that the gas mixture, when subjected to said catalytic treatment, will contain volumes of nitrogen, hydrogen, and CO in the relation of one volume of nitrogen to three volumes of hydrogen and CO taken together, subjecting the thus catalyzed gas mixture to purification steps for the removal of ingredients deleterious to the catalysis of nitrogen and hydrogen, passing the purified gas mixture through an ammonia catalyst under pressure appropriate for efficient catalysis and, under said catalyzing pressure, conducting at least the final step of the antecedent sequence of purification treatments, preserving said pressure without release thereof from the final purification treatment to the catalyst.

24. The method of producing ammonia by the use of atmospheric nitrogen which comprises producing from carbonaceous fuel, air, and water, a gas mixture containing nitrogen, hydrogen, and carbon monoxide, subjecting said gas mixture to catalytic treatment with steam to cause replacement of the CO by equivalent volumes of hydrogen, regulating the conduct of the foregoing operations so that the gas mixture, when subjected to said catalytic treatment, will contain volumes of nitrogen, hydrogen, and CO in the relation of one volume of nitrogen to three volumes of hydrogen and CO taken together, subjecting the thus catalyzed gas mixture to purification steps for the removal of ingredients deleterious to the catalysis of nitrogen and hydrogen including scrubbing the gas with an aqueous medium to remove $CO_2$, with a cuprous solution to remove CO and a final treatment to dry the gas mixture, each of said purification steps being conducted under pressure and without intermediate release of pressure and thereupon passing the purified and dried gas mixture through an ammonia catalyst under pressure appropriate for efficient catalysis and upwards of 50 atmospheres and, under said catalyzing pressure, conducting at least the final drying step of the antecedent sequence of purification treatments, preserving said pressure without release thereof from the final drying step to the catalyst.

25. The method of producing ammonia by the use of atmospheric nitrogen which comprises producing from carbonaceous fuel, air, and water, a gas mixture containing nitrogen, hydrogen, and carbon monoxide, subjecting said gas mixture to catalytic treatment with steam, to cause replacement of the CO by equivalent volumes of hydrogen, regulating the conduct of the foregoing operations so that the gas mixture, after said catalytic treatment, will contain volumes of nitrogen and hydrogen in the approximate relation of 1 : 3, subjecting the thus catalyzed gas mixture to a succession of purification steps for the removal of ingredients deleterious to the catalysis of nitrogen and hydrogen, said purification steps including a sequence of purification treatments conducted under pressure and without intermediate release of pressure, and passing the purified gas mixture under retention of the pressures of the pressure purification stages through an ammonia catalyst under pressure appropriate for efficient catalysis.

26. The method of producing ammonia by the use of atmospheric nitrogen which comprises heating a carbonaceous material and introducing to it steam and a gas mixture containing nitrogen and oxygen, said gases being introduced in such quantities as to obtain a gas in which the nitrogen content by volume is no greater than approximately one-third of the sum of the hydrogen and carbon monoxide content by volume, subjecting said gas to treatment, including catalytic treatment with steam, to convert carbon monoxide to hydrogen and to establish in the gas mixture a nitrogen-hydrogen ratio of approximately 1:3, subjecting the thus catalyzed gas to pressure and removing in a succession of pressure purification steps in each of which at least a portion of the pressure of the antecedent purification step is retained, ingredients deleterious to an ammonia synthesis catalyst, said steps including at least a water-scrubbing step, a treatment with a chemical solution adapted to remove carbon monoxide and contact with material having water-absorbing property, and passing the purified gas mixture under retention of the pressures of the purification stages into contact with an ammonia synthesis catalyst under a pressure appropriate for the synthesis of ammonia.

27. The method of producing ammonia by the use of atmospheric nitrogen which comprises producing from carbonaceous fuel, air, and water, a gas mixture containing nitrogen, hydrogen, and carbon monoxide, subjecting said gas mixture to catalytic treatment with steam, to cause replacement of the CO by equivalent volumes of hydrogen, regulating the conduct of the foregoing operations so that the gas mixture, after said catalytic treatment, will contain volumes of nitrogen and hydrogen in the approximate relation of 1:3, subjecting the thus catalyzed gas mixture to successive purification steps including a water scrubbing step, a copper solution scrubbing step, and a step wherein the gas is contacted with material having water-absorbing property, all of said steps being conducted under pressure without intermediate release of pressure and then passing the purified gas mixture under retention of the pressure of the purification stages through an ammonia catalyst under pressure sufficient for efficient catalysis.

FREDRIK W. DE JAHN.